US005207143A

United States Patent [19]

Monacelli

[11] Patent Number: 5,207,143

[45] Date of Patent: May 4, 1993

[54] PNEUMATIC FASTENER DRIVING APPARATUS WITH AN IMPROVED VALVE

[76] Inventor: Umberto Monacelli, via Parini, 6, I-20052 Monza, Italy

[21] Appl. No.: 701,175

[22] Filed: May 16, 1991

[51] Int. Cl.[5] .......... F16D 31/02; B25C 1/04

[52] U.S. Cl. .......... 91/442; 91/461; 227/130

[58] Field of Search .......... 91/461, 417 A, 5, 442; 173/13, 15, 126, 127; 227/130

[56] References Cited

U.S. PATENT DOCUMENTS

| | | | |
|---|---|---|---|
| 3,169,452 | 2/1965 | Dugin | 91/461 X |
| 3,437,013 | 4/1969 | Volkmann | 91/461 |
| 3,568,909 | 3/1971 | Perkins . | |
| 3,657,968 | 4/1972 | Lange | 91/461 X |
| 3,673,922 | 7/1972 | Doyle | 227/130 X |
| 4,252,261 | 2/1981 | Klaus et al. | 91/417 A X |
| 4,747,338 | 5/1988 | Crutcher | 91/461 |
| 5,020,712 | 6/1991 | Monacelli | 227/130 X |

*Primary Examiner*—Edward K. Look
*Assistant Examiner*—John Ryznic
*Attorney, Agent, or Firm*—Welsh & Katz, Ltd.

[57] ABSTRACT

A pneumatic operated fastener driving device having a trigger valve and an improved main valve with a flexible membrane that controls the flow of compressed air to and from the cylinder. The flexible membrane maintains the main valve close no matter when the tool is connected or disconnect to an air supply line. Further, the main valve including the flexible membrane are designed and constructed to undergo a high number of tool cycles to provide long wear and low maintenance.

19 Claims, 4 Drawing Sheets

PNEUMATIC FASTENER DRIVING APPARATUS WITH AN IMPROVED VALVE

BACKGROUND OF THE INVENTION

1. Field of the Invention

This invention relates to a pneumatic fastener driving tool and more particularly to an improved valve means used in such a tool.

2. Background of the Invention

Pneumatic tools for driving fasteners such as nails, staples, brads and such are commonly used in the commercial work place. All of these devices have typical components comprising a housing to store compressed air, a cylinder in which a piston and driver combination is reciprocated therein, a valve means to provide pressurized air to the piston and a fastener carrier means to position successive fasteners underneath the driver prior to each driving stroke.

During operation of such tools, the tool is positioned in contact with the workpiece and the trigger is manually pulled which in turn operates a valve means that provides compressed air to the portion of the cylinder adjacent the top side of the piston. When the tool is used as a stationary device the trigger is replaced by a remote actuator.

As the piston reaches the end of the driving stroke, a return air chamber is pressurized to provide air pressure for the return stroke of the piston and driver. After the trigger is released, the valve closes blocking air into the top of the cylinder and in turn opens an exhaust port to release the air above the piston to the atmosphere. The stored air within the return chamber acts upon the underside of the piston to return it to the rest position at the uppermost portion of the cylinder.

To provide enough power to drive the fastener, the air must enter the cylinder above the piston quickly. To accomplish this, the valve means is normally divided into two functions. A first valve is located directly above the top of the cylinder and is shifted from a closed to open position pneumatically. By utilizing air pressure the valve can be held closed tightly and then opened with a snap action when air pressure on a portion of the valve is reduced.

To provide the change in air pressure on the first valve, a second smaller valve is actuated by pulling the trigger lever. The lever operates a plunger that in turn controls the movement of the main valve. This type of valve means is preferred since the force and movement needed is much less than that required if the main valve was moved directly by the trigger.

Most of the tools used for fastening applications are manually handled and used in environments where dirt and other contaminates exist that are detrimental to the life of the components. The parts most likely to cause failure are those associated with the valve. Although instructions are typically supplied with each tool informing users to regularly clean and lubricate the tool, many times it is not done or done properly resulting in damage to the components.

It is advantageous for this type of application to keep moving parts and air seals at a minimum. Most tools utilize O-rings as seals, but they require proper lubrication to provide long wear life. Other arrangements have been tried such as that disclosed in U.S. Pat. No. 4,747,338, however, this arrangement requires many additional components complicating the design. Also such a design subjects the seals to stretching due to unsupported sections when opposite sides of the seal are at a large difference in air pressure.

The seal design disclosed in U.S. Pat. No. 4,747,338 may be an improvement over O-rings, but component life can be further improved resulting is less need for service.

SUMMARY OF THE INVENTION

The present invention has taken into account these and other disadvantages, and thus it is a primary object to provide an improved pneumatic fastener driving tool utilizing an improved valve means according to the present invention, which is less subject to failure.

Another object of the present invention is to provide an improved valve located above the cylinder of a pneumatic fastener driving tool utilizing a minimum quantity of components.

A further object of the present invention is to provide an improved pneumatic powered fastener driving tool including a housing having a compressed air chamber and a cavity; a cylinder disposed within the housing and selectively fluidly connected to the compressed air chamber; a piston slidably disposed within the cylinder for reciprocating movement therein, the piston dividing the first cylinder into first and second portions; fastener driving means associated with said piston for driving fasteners; a main valve positioned adjacent said first cylinder portion sealing said compressed air chamber from said first cylinder portion when in a closed position and coupling said compressed air chamber with the first cylinder portion when in an opened position, the main valve including a movable portion disposed in the housing cavity and a flexible membrane, the flexible membrane extending between the main valve and the housing and sealing the compressed air chamber from the housing cavity, the flexible membrane being substantially supported by surfaces on the main valve and the housing during movement to prevent its stretching during operation of the apparatus; and a trigger valve selectively coupling the housing cavity with the compressed air chamber and the atmosphere, respectively, for pressurizing and exhausting said housing cavity for controlling the main valve, wherein upon activating the trigger valve compressed air is exhausted to the atmosphere from the housing cavity causing the main valve to open and couple the compressed air chamber with the first cylinder portion actuating the piston and driving means, and upon deactivating the trigger valve the housing cavity is coupled with the compressed air chamber causing the main valve to close and seal the compressed air chamber from the first cylinder portion.

The present invention relates to the improved design and construction of the main valve located above the cylinder in a pneumatic fastener driving tool and the improved tool itself. The main valve according to the present invention can be incorporated and will function with most any type of trigger valve. The requirement of the trigger valve means is to be able to reduce the air pressure on one side of the main valve to something less than that in the tool housing.

Since the present invention deals only with the design and construction of the main valve and will function or operate on tools with wide variations in the housings, cylinders, pistons, fasteners, trigger valve means etc., the objects and description concentrate only in the area related to the main valve. However, any related tool incorporating the main valve according to the present invention as a unit is considered to fall within the scope of the present invention.

These and other objects of the present invention will become more apparent from the following description and drawings in which:

DETAILED DESCRIPTION OF PREFERRED EMBODIMENTS

Figure 1:
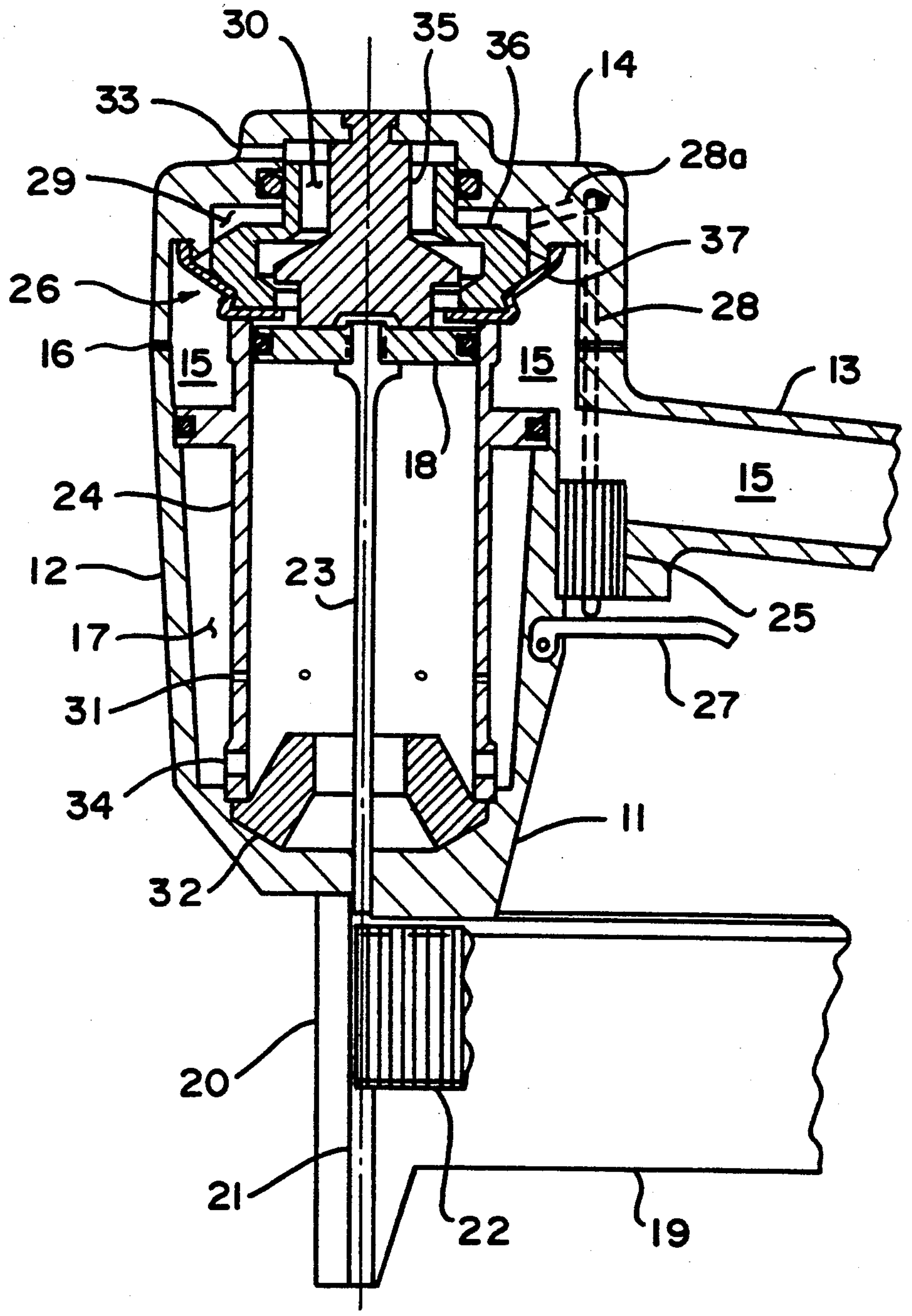
FIG. 1 is a partial side cross-sectional view of a pneumatic powered fastener driving tool according to the present invention.

Referring to FIG. 1, the tool comprises a housing 11 having a body portion 12, a handle 13 and a cap 14. The size and shape of these components vary considerably depending on the type of fastener and application, but all have in common an internal cavity used as a compressed air chamber 15.

The compressed air chamber 15 is pressurized from an air supply line through an inlet connection attached to the handle (not shown). In this particular embodiment, the cap 14 is attached to the body portion 12 with screws (not shown) and utilizes part of the cap 14 to enlarge the volume of the compressed air chamber 15. The body portion 12 and cap 14 are joined by a seal 16 to prevent compressed air from escaping into the atmosphere.

The cavity within the body portion 12 is divided into two sections. The first section is the pressurized air chamber 15, as described-above, and the other section provides a return air chamber 17. The return air chamber 17 is pressurized when the piston 18 is near the end of its drive stroke. The sequence of pressurizing the return chamber 17 will be described in detail below.

The lower portion of the housing 11 is connected to a fastener carrying rail 19. The front of the rail 19 commonly is defined by the nosepiece 20, which is provided with a guide cavity 21 shaped to match that of the fastener 22. A pusher means (not shown) delivers the fastener 22 into the nose cavity 21 underneath the end of a driver 23. The driver 23 is fixed to the piston 18 and function together as a unit.

A cylinder 24 is mounted in the housing 11 in which the piston 18 reciprocates during operation. The piston divides the cylinder 24 into first and second cylinder portions. To control the movement of the piston 18, a valve means is employed comprising a trigger valve 25 positioned near the handle 13 and a main valve 26 according to the present invention.

The trigger valve 25 is controlled by a manual lever 27 as shown in FIG. 1. Actuation of the lever 27 causes trigger valve 25 to exhaust the passageways 28,28*a* when pulled, and pressurizes the passageways 28,28*a* when lever 27 is released. The embodiment of the tool shown in FIG. 1 is that of a manually operated tool, but should a tool be part of a stationary application the trigger valve means could be a remotely located valve and operated by something other than lever 27. The present invention only requires passageways similar to passageways 28, 28*a* or equivalents to pressurize and exhaust air to and from cavity 29 positioned above the main valve 26.

The sequential operation of the above-described fastener driving apparatus will now be described. When an air supply is connected to the tool, the reservoir 15, passageways 28, 28*a* and cavity 29 are pressurized, and the piston return chamber 17, exhaust passageway 30, and the volume in the cylinder 24 below the piston remain unpressurized. A fastener 22 positioned in the nosepiece 20 under the driver 23 from the previous tool cycle is ready to be operated on.

The tool is positioned on the workpiece and the trigger lever 27 is pulled upward. The trigger valve 25 actuates to exhaust the air in passageways 28, 28*a* and cavity 29. The main valve 26, which was closed, now shifts to an open position due to the pressurized air in reservoir 15 acting upon the bottom area of the main valve 26.

The shifting of the main valve 26 allows the air to enter the top or first portion of the cylinder 24 above the piston 18 while at the same time blocking the communication of the cylinder 24 to the atmosphere through exhaust passageway 30. The piston 18 along with driver 23 are forced downward rapidly. The driver 23 pushes the fastener 22 out of the nosepiece 20 with enough force to drive the fastener 22 into the workpiece (not shown).

Near the end of the drive stroke, the piston 18 passes a series of small holes 31 in the cylinder 24 that allows air to enter and pressurize return air chamber 17. At the end of the drive stroke, the underside of the piston 18 contacts a shock absorber 32. The shock absorber 32 prevents damage to the tool that may occur should the piston 18 strike the housing 11 directly. The shock absorber 32 also acts as a seal to prevent air from the return chamber 17 from escaping into the atmosphere.

The lever 27 is then released and trigger valve 25 again pressurizes passageways 28, 28*a* and cavity 29. The main valve 26 is pneumatically balanced towards the closed position whenever both the upper and lower sides are subjected to equal air pressure. The main valve 26 thus closes when cavity 29 is pressurized, by operating trigger valve 25, and communication between compressed air chamber 15 and the top of cylinder 24 is blocked.

The shifting of the main valve 26 to the closed position allows the space above the piston 18 to again communicate with the atmosphere, and the air above the piston 18 exhausts through exhaust passageway 30 and exhaust port 33. When the air pressure above the piston 18 drops below that under the piston 18, the air in the return air chamber 17 enters the cylinder 24 under the piston 18 through holes 34 and forces the piston 18 and driver 23 upward. Return air chamber 17 has a fixed volume, thus as piston 18 moves upward the pressure in return air chamber 17 is reduced.

The return air chamber 17 is designed with sufficient volume to provide enough air to fully return the piston 18 at the lowest operating pressure with the pressure being reduced to nearly that of the atmosphere prior to the next tool cycle. As the end of the driver 23 raises above the fastener rail 19, the next fastener 22 is positioned into the guide cavity 21 ready to be driven by the next tool cycle.

Alternative means of returning the piston, stopping the stroke, feeding fasteners into position to be driven, etc. can be substituted for those shown and described. Further, the tool cycle sequence described may be preferred for a particular tool, but it in no way restricts or limits the present invention other than that defined in the claims.

Figure 2:
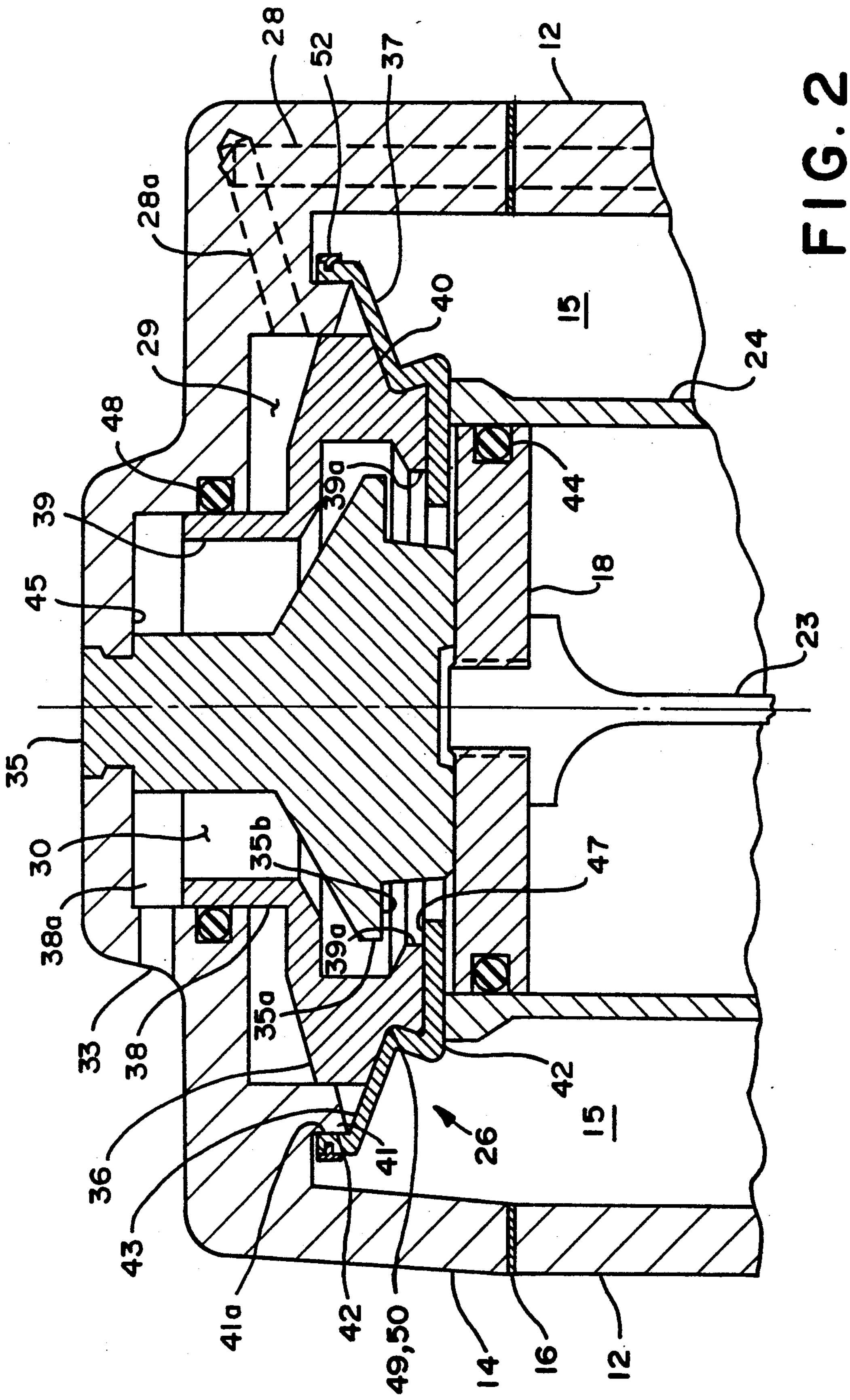
FIG. 2 is an enlarged scale partial side cross-sectional view of the tool according to the present invention with the main valve shown in the closed position.

Referring to FIG. 2, there is illustrated an enlarged partial side cross-sectional view of the tool showing the details of the main valve 26. The cap 14 and seal 16 are separate parts attached to the body 12 for convenience of machining and assembly, but when assembled act as a unit to form housing 11. Located in the center of the cap 14, is formed a stop 35, which when assembled also becomes a fixed portion of the housing 11. The stop includes valve seating surfaces 35*a* and 35*b*. The stop 35 cooperates with the moveable portion 36 of the main valve to be described below to open and close exhaust passageway 30. The stop 35 is constructed and made of material so as to be rather rigid in nature, although it may be constructed of a material other than metal to help absorb the shock from the returning piston 18. The stop 35 is shown attached by an interference fit with a through hole in the cap 14, but could also be attached by threaded or other means.

The main valve 26 is preferably constructed of only two moving members including a movable portion 36 disposed within cavity 29 and a flexible membrane 37. In the embodiment shown, the moveable portion 36 can be defined as a piston slidably disposed within cavity 29 defined as a cylinder. Further, the moveable portion 36 is annular in shape to accommodate the exhaust passageway 30. The movable portion 36 can be provided with an extension 38 (e.g. a piston) slidably disposed within another cavity 38*a* (e.g. a cylinder) for sealing cavity 29 and providing a guide for the moveable portion 36 of the main valve 26. The extension 38 opens and closes the exhaust port 33 depending on its position within cavity 38*a*. The extension 38 together with a portion of the inner surface of the cap 14 and O-ring 48 define cavity 29.

An inner surface 39 of moveable portion 36 defines a portion of the exhaust passageway 30. The inner surface 39 provides a valve seating surface 39*a*, cooperating with seat 35*a* of the stop 35.

The lower surface or face 40 of movable portion 36 is connected to flexible membrane 37. The flexible membrane 37 extends between the movable portion 36 of the main valve 26 and an annular rim 41 of the housing 11 or cap 14. An inner peripheral surface 42*a* of the flexible membrane 37 engages an outer annular surface 41*a* of the annular rim 41.

One of the greatest concerns and requirements regarding fastener driving tools is that a fastener is not inadvertently shot from the tool when an air supply is first connected to the tool. All tools are designed to hold the valve closed when the air supply is connected to the tool, but when the tool is not connected to an air supply, the valve components could be jarred out of the normal position with the valve not being tightly closed. Should air enter the cylinder as the air supply line is connected to the tool, the piston could move downward and push a fastener out of the tool. This may result in serious injury, or even death. Most tools are designed with a spring that has sufficient strength to hold the valve closed until the air pressure builds within the tool to pneumatically hold the valve closed. This method will work of course, but it requires additional components which in turn increases possible part failure.

Eliminating the need for the spring is most desirable. Accordingly, in the present invention, the flexible membrane 37 is molded in a saucer-like annular shape with a large hole in the center. The thickness of the flexible membrane 37 is not uniform in order to provide more strength in the section that undergoes little or no movement.

When installed in the tool, the inner peripheral surface portion 42*a* of the flexible membrane 37 engages the annular rim 41 of the housing 11 and the lower portion 42 of the flexible membrane 37 rests against the top of cylinder 24. In this installation, the flexible membrane seals compressed air chamber 15 from cavity 30. The elastic characteristics of the material from which the flexible membrane 37 is constructed keeps the annular peripheral surface 42*a* in contact with the annular rim 41 of the housing 11 and the lower portion 42 against cylinder 24 whenever both surfaces of the flexible membrane 37 are exposed to the atmosphere or both surfaces are subjected to air having equal pressure. This has a great advantage over valves using O-rings as seals since and additional components, such as springs, are not required to assure that the valve is closed when an air supply is not connected to the tool.

The flexible membrane 37 remains against the cylinder 24 as long as both sides are subjected to equal air pressure. To fire the tool, the upper side 43 of the flexible membrane 37, positioned opposite the compressed air chamber 15, must be subjected to reduced pressure. This is done by exhausting cavity 29 through passageways 28, 28*a* by means of the trigger valve 25. Now that the opposite sides of the flexible membrane 37 are subjected to unequal pressure, the flexible membrane 37 is forced to deflect upward by the pressure in reservoir 15. This position can be seen in FIG. 3.

Figure 3:
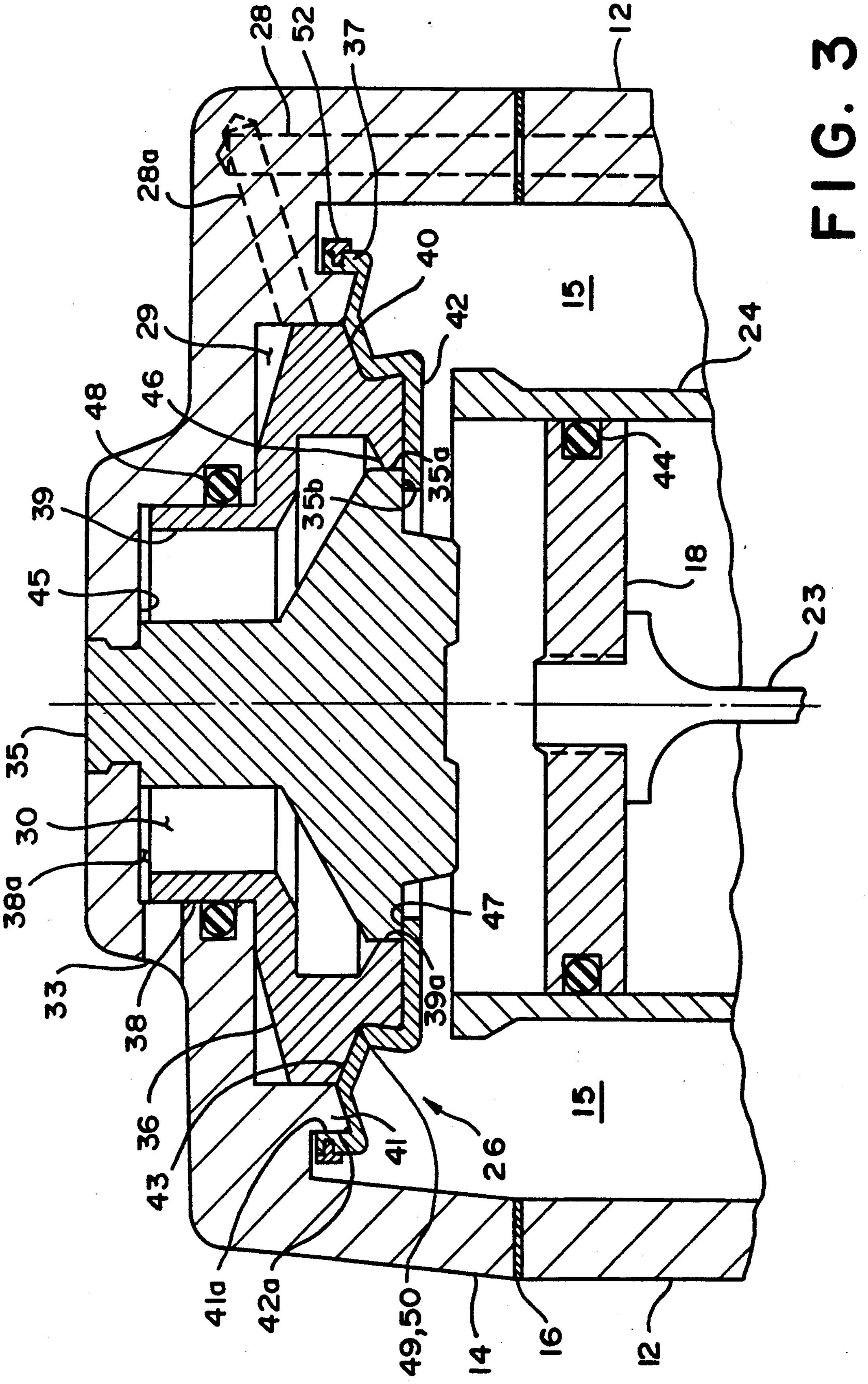
FIG. 3 is similar to FIG. 2, with the main valve shown in the open position.

Referring to FIG. 3, the cavity 29 is at atmospheric pressure, and thus, the air pressure in compressed air chamber 15 forces the flexible membrane 37 away from the top of the cylinder 24. The movement of the flexible membrane 37 forces the movable portion 36 upward until it makes contact with the upper inner surface of the cap 14. The dimensions of the moveable portion 36 and the cavity 38*a* limit the movement of the moveable portion 36 within the cavity 38*a* so as not to overstretch the flexible membrane 37. Movement of the flexible membrane 37 away from the top of cylinder 24 allows pressurized air to enter and force the piston 18 downward. Seal 44 is used to prevent air from escaping around the piston 18.

As previously described, during the tool cycle in which the piston 18 returns to the uppermost portion of the cylinder 24, the air above the piston 18 must be exhausted to the atmosphere. The prior art utilizes a secondary valve means or at least a secondary seal in conjunction with the moveable portion of the valve to close an exhaust means during the drive stroke. Such a design is shown and described in U.S. Pat. No. 3,568,909.

The present invention could also utilize such a seal means positioned against the flat inner surface 45 of cap 14, or there could be an interference fit between the center stop 35 and movable portion 36 in the area shown at 46 when the movable portion 36 is raised. Both of these arrangements and other suitable arrangements can be utilized in the present invention.

The preferred method of blocking the exhaust of air during the drive stroke is to have the inner rim 47 of the flexible membrane 37 extend inwardly dimensionally more than the moveable portion 36 and overlap and make sealing contact with the peripheral seating surface **35*b* of the center stop 35. Air pressure from compressed air chamber 15 will keep the inner rim 47 tightly sealed against the seating surface 35*b* of the stop 35 and moveable portion 36 thus preventing any loss of air. There is another advantage in that the stop 35 and moveable portion 36 do not have to be precise in size or location, since the flexible characteristics of the membrane 37** will compensate for variations.

It is well known that any component that is constructed from a flexible material will tend to deform when a force is applied. The flexible membrane 37 of the present invention is relatively thin, and thus would easily deform when air pressure on opposite sides were unequal, unless the side of lesser pressure was supported by a more rigid material. It can be seen in FIG. 3, that the flexible membrane 37 is completely supported on the side exposed to the atmosphere by the inner surfaces of the housing 11 (cap 14), surfaces of the center stop 35 and surfaces of the moveable valve portion 36, thus flexible membrane 37 is not stretched into unsupported areas. When the main valve 26 is in the closed position, the upper side 43 of the flexible membrane 37 has the same pressure, thus again no stretching occurs. This feature eliminates the problem most frequently causing failures in diaphragm type seals.

After the tool has made the drive stroke, the main valve 26 is reset to the closed position as shown in FIG. 2, by repressurizing cavity 29 through passageways 28 and **28*a*. An O-ring type seal 48 is used to prevent air from escaping out of the cavity 29 between housing 11 (cap 14) and moveable valve portion 36. The O-ring seal 48 is shown for convenience, but the seal could be one of several commercially available. As the moveable valve portion 36 forces the flexible membrane 37 away from center stop 35, it again seals against the top of the cylinder 24 blocking air from the compressed air chamber 15. The compressed air used to drive the piston 18 downward can exhaust to the atmosphere by going between the outer surfaces of the center stop 35 and the inner surfaces of the moveable valve portion 36 through exhaust passageway 30 and out of exhaust port 33**.

Should the air supply be disconnected from the tool while the main valve 26 was in the open position, as shown in FIG. 3, the flexible membrane 37 would return to the closed position on top of the cylinder 24, as shown in FIG. 2. To assure that moveable valve portion 36 also returns to its "at rest" position, the flexible membrane 37 must pull the moveable valve portion 36 downward as the flexible membrane 37 resets.

Although other methods of securing the flexible membrane 37 to the moveable valve portion 36 would work, such as by using adhesives, the presently preferred method is to have a slight recess 49 in the outer surface of moveable valve portion 36 and the flexible membrane 37 to have a like protrusion 50 that seats into the recess 49. The flexible membrane 37 can be easily removed for service, but the gripping force between the flexible membrane 37 and moveable valve portion 36 is greater than the frictional forces between moveable valve portion 36 and O-ring seal 48.

Figure 5:
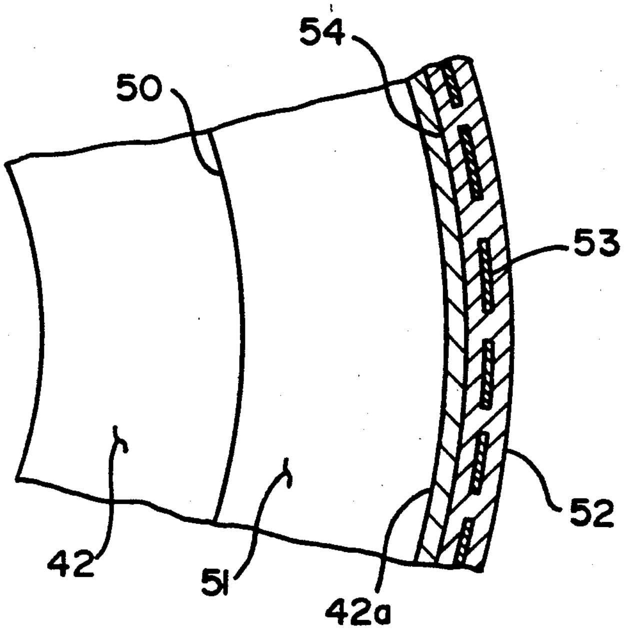
FIG. 5 is a partial top cross-sectional view of the flexible membrane shown in FIG. 4 taken along line A—A.
Figure 4:
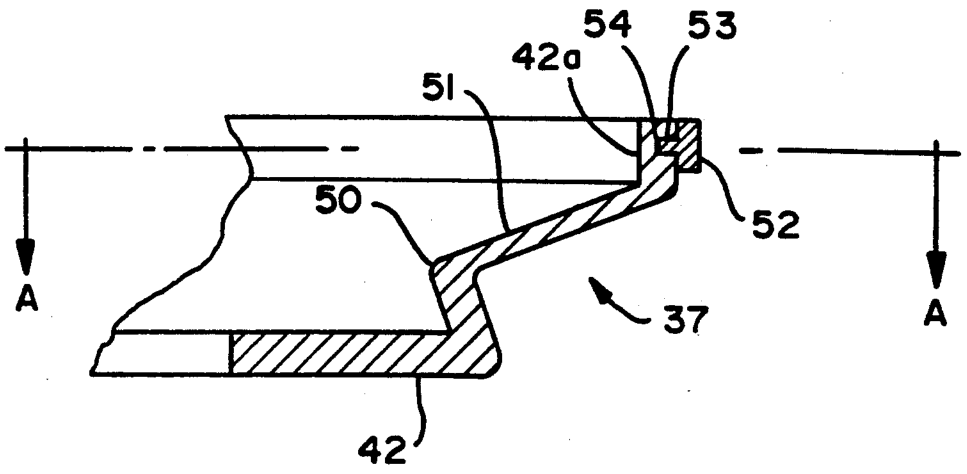
FIG. 4 is an enlarged scale partial side cross-sectional view of the flexible membrane illustrating the construction of the upper portion.

Referring to FIGS. 4 and 5, the construction of the flexible membrane 37 will be described. The term "flexible" or "flexible material" is distinguished from "rigid" in the degree of bending. Examples of the flexible material used in the major portion of the flexible membrane 37 are rubber or a plastic hytrel, which has rubber-like characteristics.

The movable valve portion 36 of the main valve 26 is made from a material such as nylon which has good wear properties but will resist bending or flexing. The annular rim 42 and lower portion **42*a* of the flexible membrane 37 are molded as thicker sections, since they both undergo very little flexing. However, it is desirable that the middle portion 51** is molded thinner to reduce failure due to fatigue.

The cycle of the valve 26 when used in fastener driving tools will operate at a rate of 10 to 15 cycles per second. It is normal to expect these tools to operate over one-half million cycles before any servicing is needed. During the cycle the upper annular rim 42 of the flexible membrane 37 remains in contact with the annular rim 41 of the housing 11 (cap 14). Although there are numerous ways to achieve this, the presently preferred embodiment is to have the upper annular rim 42 of the flexible membrane 37 prepared with an inside circumference smaller than the mating surface **41*a* of the annular rim 41 of the housing 11 (cap 14**). This will provide securing and sealing contact therebetween with or without a pressurized air supply connected to the tool.

As noted before, the desired life expectancy of the flexible membrane 37 is hundreds of thousands of cycles. Although the sectional design and material selection will reduce the fatigue within the flexible membrane 37, the ability of the upper annular rim portion 42 to maintain its original circumferential shape and size will diminish after prolonged operation.

To assure the upper annular rim portion 42 does not expand, a retaining ring 52 can be used around the outside periphery. The retaining ring 52 is molded from a rigid material such as nylon with a section that will interlock with portion 41. The retaining ring 52 could be a separate component, but the retaining ring 52 and flexible membrane 37 would be best to remain together during assembly or servicing of the tool.

The preferred embodiment is to first mold the retaining ring 52 in a "T" shape with small slots 53 in the inward section 54. The retaining ring 52 can then be placed in a mold for producing flexible membrane 36. As the material is introduced into the mold it will flow into the slots 53. The finished flexible membrane 37 will have the retaining ring 52 fixed thereto and the retaining ring 52 will become a part of the upper annular rim portion 42. The flexible membrane 37 can be installed without difficulty and will retain its shape and elasticity.

It must be understood the terms such as upper, lower, above, downward and the like are used in reference to the figures shown in the drawings solely for the purpose of clarity. While the preferred embodiment of the present invention has been shown, it is anticipated those skilled in the art may make numerous changes and modifications without departing from the spirit of this invention which is intended to be limited only by the scope of the following appended claims.

I claim:

1. A pneumatic powered fastener driving apparatus, comprising:

a) a housing having a compressed air chamber and a cavity;

b) a trigger valve selectively coupling said cavity with said compressed air chamber;

c) a cylinder disposed within said housing;

d) a piston disposed within said cylinder to divide said cylinder into first and second portions and moveable therein between a first home position and a second position remote therefrom;

e) a main valve disposed adjacent said first cylinder portion and moveable between a third closed position, wherein said main valve blocks communication between said compressed air chamber and said first cylinder portion and establishes an exhaust path from said first cylinder portion to atmospheric pressure, and a fourth open position, wherein said main valve couples said first cylinder portion to said compressed air chamber and blocks communication between said first cylinder portion and atmospheric pressure;

f) a flexible membrane extending between said housing and said main valve and sealing said cavity from said compressed air chamber, said membrane having an outer peripheral portion, said housing holding said outer peripheral portion to permit said membrane to follow the movement of said main valve, said flexible membrane being disposed between said main valve and said cylinder forming an air tight seal therebetween whenever said main valve is in its third closed position, said flexible membrane blocking said exhaust path from said first cylinder portion whenever said main valve is disposed to its fourth open position;

g) said trigger valve actuatable to permit the flow of the pressurized air from said cavity disposing said main valve towards its fourth open position whereby said main valve couples said compressed air to said first cylinder portion thus driving said piston towards its second remote position while said main valve supports said membrane to relieve deteriating stresses otherwise applied to said membrane.

2. An apparatus according to claim 1, wherein said trigger valve is deactuated to couple said cavity to said compressed air chamber thus disposing said main valve to its third closed position and sealing said compressed air chamber from said first cylinder portion.

3. An apparatus according to claim 2, wherein said main valve and said flexible membrane remain in contact at all times.

4. An apparatus according to claim 1, wherein the elasticity of said flexible membrane holds said main valve in its third closed position whenever pressure in said air chamber is not greater than atmospheric pressure.

5. An apparatus according to claim 1, wherein said outer peripheral portion of said flexible membrane is held to said housing by means of a rigid ring.

6. An apparatus according to claim 5, wherein said rigid ring is securely affixed to said outer peripheral portion of said flexible membrane.

7. An apparatus according to claim 1, wherein said main valve and said flexible membrane are annular and said housing is provided with a center stop, said annular main valve cooperating with said center stop to define an annular exhaust passageway leading from said first cylinder portion through said annular flexible membrane to the atmosphere, said annular main valve is provided with seating surfaces cooperating with seating surfaces on said center stop in its fourth open position for closing said exhaust passageway, wherein said exhaust passageway is open when said main valve is disposed in its third closed position and said trigger valve is deactivated, and said exhaust passageway is closed when said trigger valve is activated and said main valve is disposed in its fourth open position.

8. A pneumatic powered fastener driving apparatus, comprising:

a) a housing including a compressed air chamber;

b) a cylinder disposed within said housing and fluidly coupled to said compressed air chamber;

c) a piston slidably disposed within said cylinder for reciprocating movement therein, said piston dividing said first cylinder into first and second portions;

d) a fastener driving element connected to said piston;

e) a main valve positioned adjacent said first cylinder portion and moveable between a closed position blocking communication between said compressed air chamber and said first cylinder portion, and an open position;

f) a membrane extending between said main valve and said housing, said membrane being substantial supported by surfaces of said main valve and said housing during movement to prevent its stretching during operation of said apparatus, said membrane being disposed between said main valve and said cylinder forming an air tight seal therebetween whenever said main valve is in its closed position, said membrane blocking said exhaust from said first cylinder portion whenever said main valve is disposed to its open position; and g) a trigger valve fluidly coupled to said compressed air chamber for controlling said main valve, wherein upon activating said trigger valve compressed air is released from said main valve disposing said main valve to its open position and supplying compressed air to said first cylinder portion driving said piston and said fastener driving element.

9. An apparatus according to claim 8, wherein said housing defines an exhaust passageway and said main valve cooperates with said an exhaust passageway for controlling the exhaust of air from said first cylinder portion upon the return of said main valve to its closed position.

10. An apparatus according to claim 9, wherein said housing is provided with a set of seats, which cooperate with an internal set of seats within said main valve to open and close said first cylinder portion to and from the atmosphere.

11. An apparatus according to claim 8, wherein said main valve comprises a second piston slidably disposed within a second cylinder within said housing.

12. An apparatus according to claim 11, wherein said second piston is of a sufficient thickness and limited in travel dictated by the length of said second cylinder to prevent stretching of the flexible membrane during operation of said flexible membrane.

13. An apparatus according to claim 12, wherein said flexible membrane is connected to an annular rim of said housing, said annular rim providing a supporting surface for said flexible membrane to prevent stretching thereof during repeated operation.

14. A pneumatic powered fastener driving apparatus, comprising:

a) a housing;

b) a cylinder disposed within said housing;

c) a piston slidably disposed within said cylinder for reciprocating movement between a first home position and a second position remote therefrom, said piston dividing said cylinder into first and second portions;

d) a main valve disposed within said housing and having a support surface positioned adjacent said first cylinder portion;

e) a first compressed air chamber fluidly coupled via a trigger value to said main valve;

f) said housing comprising a first fluid passageway extending between said first compressed air chamber and said first cylinder portion, a second cavity disposed on an opposite side of said main valve relative to said first cylinder portion, a second fluid passageway extending from said first compressed air chamber via said trigger valve to said second cavity, and a third fluid passageway extending from said first cylinder portion to atmospheric pressure, said main valve disposable between a third home position wherein said third passageway is opened and a fourth position wherein said third passageway is blocked and said first fluid passageway is opened;

g) a flexible membrane extending between said housing and said main valve, said support surface of said main valve supporting said membrane as said main valve moves between its third and fourth positions;

h) return means for disposing said piston to this first home position;

i) a fastener driving element extending from said piston; and j) said trigger valve actuable from a fifth rest position to a sixth position wherein said second fluid passageway is opened releasing a flow of compressed air from said second cavity and disposing said main valve to its fourth position, wherein said first fluid passageway is opened releasing compressed air into said first cylinder portion to drive said piston and said fastener driving element to its second remote position, said flexible membrane being disposed between said cylinder and said main valve whereby said flexible membrane forms an airtight seal therebetween when said main valve is dispose din its third home position and said flexible membrane blocking said third passageway when said main valve is disposed in its fourth position to prevent the escape of compressed air therethrough.

15. An apparatus according to claim 14, wherein said main valve comprises a second piston slidably disposed for reciprocating movement within said second cavity which comprises a second cylinder.

16. An apparatus according to claim 15, wherein said second piston includes an extension, said extension opening and closing said third passageway when said main valve is disposed in its third and fourth positions, respectively.

17. An apparatus according to claim 15, wherein the dimensions of said second piston and said second cylinder limit the travel of said second piston within said second cylinder to prevent overstressing of said flexible membrane during movement of said main valve.

18. An apparatus according to claim 14, wherein said flexible membrane and said main valve are annular and said housing is provided with a center stop disposed within said annular main valve, said flexible membrane having an inner rim which extends inwardly a distance greater than said support surface of said main valve to a position where said inner rims mates with said center stop when said main valve is disposed in its fourth position.

19. An apparatus according to claim 18, wherein said flexible membrane is an annular saucer-like shaped member and has an inner portion attached to said main valve, said flexible membrane through its variation in thickness and shape resiliently biasing said flexible membrane and said main valve together into a sealing relation with said cylinder when there exists no pressure differential across said flexible membrane.

* * * * *